(No Model.) 2 Sheets—Sheet 2.

E. B. RICH.
SAW FEEDING DEVICE FOR SAW SHARPENING MACHINES.

No. 392,225. Patented Nov. 6, 1888.

Witnesses:
Frank B. Blanchard
Cora L. Cadwallader

Inventor:
Elisha B. Rich.
By —— 
Attorney.

UNITED STATES PATENT OFFICE.

ELISHA B. RICH, OF BOSTON, MASSACHUSETTS.

SAW-FEEDING DEVICE FOR SAW-SHARPENING MACHINES.

SPECIFICATION forming part of Letters Patent No. 392,225, dated November 6, 1888.

Application filed March 28, 1887. Serial No. 232,650. (No model.)

*To all whom it may concern:*

Be it known that I, ELISHA B. RICH, a citizen of the United States, residing at Boston, in the county of Suffolk and State of Massachusetts, have invented a new and useful Saw-Feeding Device for Saw-Sharpening Machines, of which the following is a specification.

My invention relates to devices for feeding the saws in machines for sharpening saws, and particularly to such machines as are adapted for sharpening by means of a grinding-wheel band and other similar saws.

It has for its object to provide certain new and useful devices whereby the feeding of the saw is made more satisfactory and its several adjustments are accomplished more easily. These objects I attain by means of the mechanism illustrated in the accompanying drawings, wherein—

Figure 1:
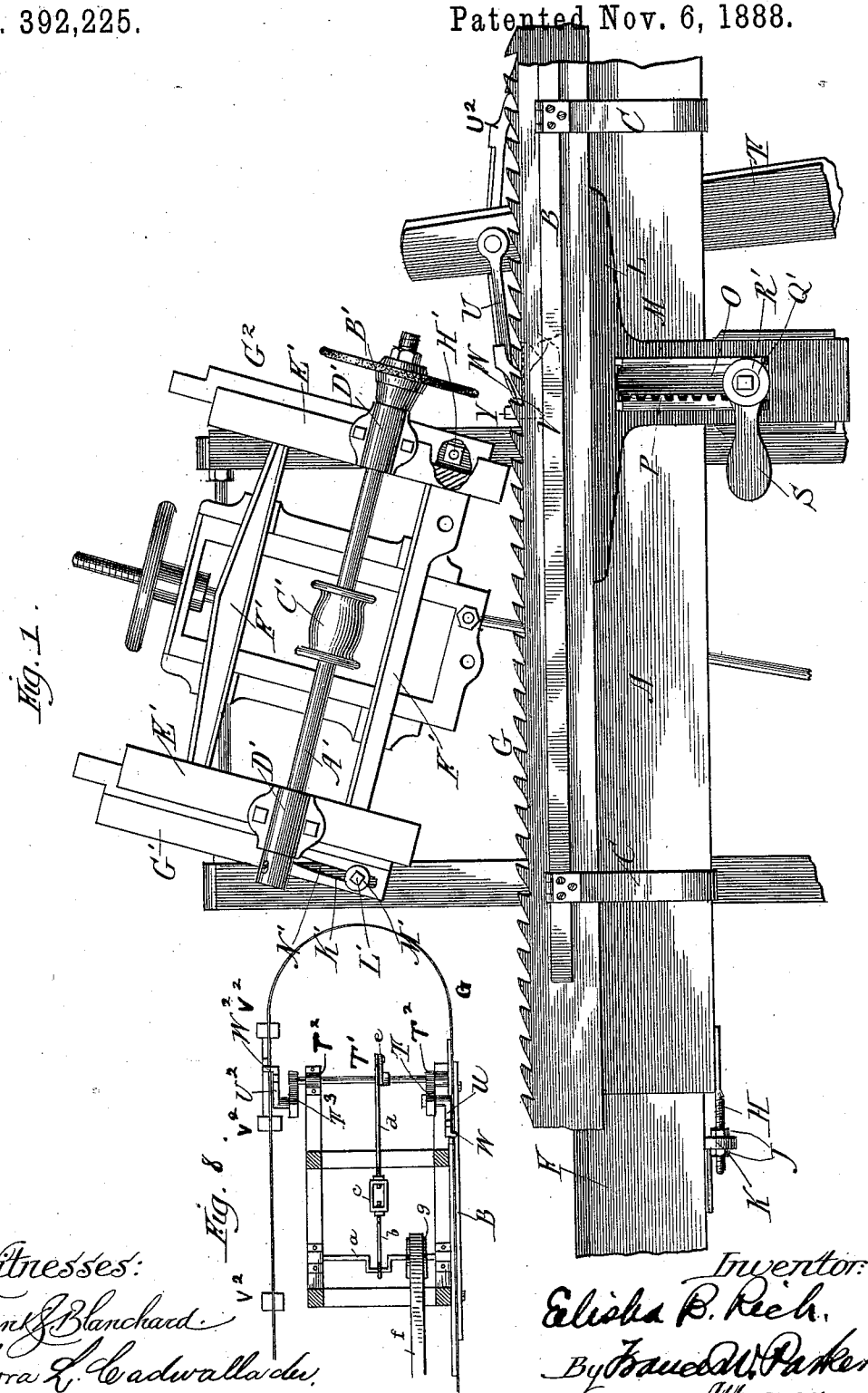
Figure 2:
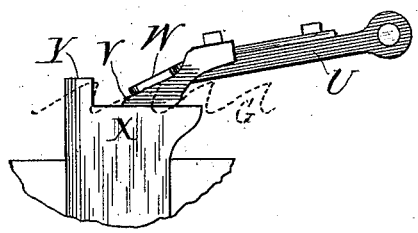
Figure 3:
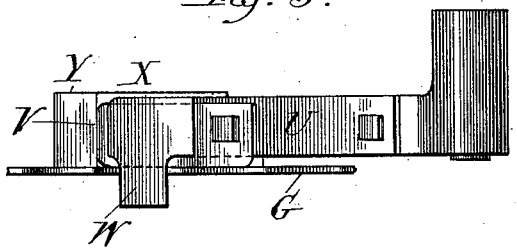
Figure 5:
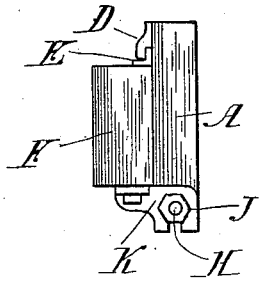
Figure 4:
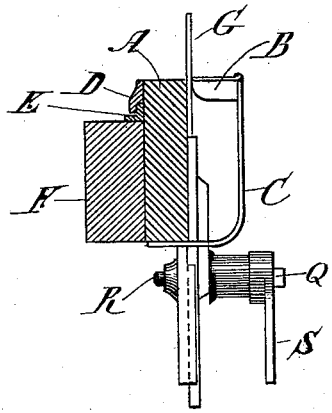
Figure 6:
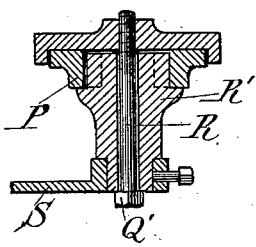
Figure 7:
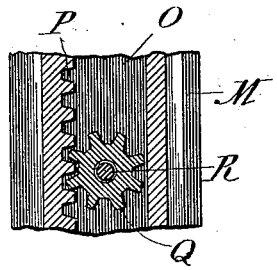

Figure 1 is a front elevation of my machine with parts unnecessary to the illustration of the specific features claimed removed. Fig. 2 is a detail side view of the feed-finger. Fig. 3 is a detail plan view of the same. Fig. 4 is a cross-section of the saw-carriage and grip-block. Fig. 5 is a detail end view of the saw-carriage. Fig. 6 is a horizontal cross-section of the mechanism for supporting the saw on its carriage. Fig. 7 is a vertical section thereof. Fig. 8 is a plan view with parts removed, showing the saw-guides.

Like parts are indicated by the same letters in all the figures.

A is the saw-carriage, having hinged thereto the grip-bar B on the spring-standards C. On the carriage is a lip, D, adapted to engage the ledge E on the frame-piece F.

G is the saw.

At one end of the carriage A is a forwardly-projecting screw-rod, H, with nuts J J thereon. This rod passes through the eye K on the frame-piece F. By moving these nuts J J on the screw-rod H the carriage A is reciprocated on the frame-piece F, and it may be placed in any desired position and very carefully adjusted in such position.

L is the saw-support, provided with a sort of upper ledge upon which the saw rests. This piece L has in its lower projecting end, M, a guideway, O, one edge of which is provided with the rack P. This rack is engaged by a pinion, Q, on the shaft R, which shaft is journaled in a portion of the frame of the machine. On the shaft R is secured a hand-piece, S. By turning this hand-piece the shaft R is rotated in its bearings. The pinion Q engages the rack. This raises the ledge L.

T is a lever upon which the feed-finger is pivoted, its lower end being broken away. This lever is rocked so as to carry the feed-finger back and forth along the edge of the saw by any convenient mechanism such as that commonly used in saw-sharpeners. This finger U is pivoted to the lever T, and is provided with a point, V, and a side projection, W, the latter being shorter than the former. These parts may be attached together by bolts, as shown, or cast in one piece, or otherwise formed, as may be found convenient.

X is the portion of the carriage upon which the finger slides and by the side of which the saw is moved. Y is a stop thereon, which is engaged by the point V of the feed-finger U.

In operation the lever T is rocked back and forth, and the side projection, W, of the finger U engages the tooth of the saw and moves the saw forward, so that it is brought into position, when it may be engaged properly by the descending grinding-wheel. This finger, being provided with the point V, which slides upon the portion X, is held in such position that the tooth is engaged by the side projection, W, about midway of its height, and this is done to avoid difficulty which might arise in a case where the tooth at its inner extremity had been hollowed out, so as to admit the point of the feed-finger, and thus cause the descending wheel to strike the point of the tooth and remove a considerable portion of it in the process of grinding. The part X is secured to the carriage, and when the throw of the lever T has been once fixed slight variations in the stroke of the finger can be properly adjusted by the use of the nuts J J, whereby the position of the stop Y with reference to the lever T and point V can be slightly changed at will.

A' is the grinding-wheel arbor; B', the grinding-wheel; C', the driving-pulley. The arbor is journaled in the boxes D' D', attached to the bars E' E', which, together with the cross-pieces F' F', form a frame. The frame, consisting of the bars E' E' and cross-bars F' F', in connection with side pieces, G' G², is pivoted at one end to the standard X¹⁰ and at the other is adjustably secured to the standard X¹¹, said standards rising from and being secured to the base of the machine. These pieces E′ E′ of the frame are arranged so as to slide upon the pieces G′ and G², respectively.

G² is pivoted to the standard at the point H′, and G is adjustably secured to its standard at the point K′ by means of the bolt L′, nut M′ thereon, and slot N′, through which such bolt passes. By raising or lowering the bar or piece G′ and securing it in the desired position by the nut M′ the saw-arbor may be tilted, so as to give the grinding-wheel the proper inclination, according to the character of the saw-teeth to be ground or the inclination it is desired to give such teeth.

Q′ is a nut on the end of the screw-bolt R, which is used to lock the sleeve R′ and the pinion which it carries in position.

T′ is a rock-shaft journaled on the base of the machine-frame at the points T² T², and from it rises at one end the lever T and at the other the lever T³. The lever T³ is provided with the finger U², having the part W², similar to the finger U and part W.

V² V² V² are slotted guides along which the band-saw G travels, and the levers, rocking back and forth, cause the fingers to feed the saw continuously around the machine, thus enabling the saw to be handled in a comparatively small space and assisting the feeding of the point where the grinding is done.

The use and operation of my invention are as follows: The saw-support L is raised or lowered to the proper position by means of the pinion Q, operating on the rack P. This pinion is turned by first turning the nut Q′ and then operating the handle S. When the saw-support L has reached its proper position, according to the width of the saw to be sharpened, the bolt Q′ is turned so as to lock the sleeve R′ and pinion in position. The grinding-wheel arbor-frame, in connection with the pieces G′ G², is pivoted at the point H′. Now, by loosening the nut N′ M′ on the bolt L′ and then tipping the piece G² and the grinding-wheel frame in either direction, any inclination may be given to the grinding-wheel B′, and when the inclination is fixed according to the dip of the teeth upon the saw to be sharpened the frame is locked by locking the nut M′, and the grinding-wheel retains its inclination until readjusted. The feed-finger which I employ is particularly illustrated in Figs. 2 and 3. The point V, sliding upon the portion X, elevates the side projection, W, so that the same will strike the saw-tooth somewhat above its lower inside point. This is designed to obviate the difficulties which attend the use of saw-sharpening machines and grow out of the fact that the tooth-notch is sometimes hollowed out to such a degree that if the feed pawl or point should be allowed to go clear into the notch the tooth would not be carried far enough under the descending grinding-wheel B′, and a considerable portion of its point would be ground off. Another feature of this feed-tooth is the fact that it is provided with the forwardly-projecting point V, which engages the stop, and this limits the motion of the finger, but does not interfere with the descent of the grinding-wheel.

The chief feature of my improvements consists in the relation between the finger, the stop Y, and the adjusting mechanism H, K, and J. It is found that in the sharpening of saws in a machine of the character shown in the drawings the power required to move the saw the requisite distances to successively bring the teeth under the grinding-wheel greatly varies, according to the condition of the surface of the saw and its thickness. Thus upon one portion of a given saw a certain power will be used by the lever T in moving the finger U and throwing the saw far enough to bring the next tooth under the grinding-wheel. In the next position, or further on in the work of grinding the saw, it will be found that a great deal more power is required, owing to the gummed or otherwise interfering condition of the saw and the fact that it is bound by the saw-carriage A and the spring-block B. The ordinary adjustment of the throw of the finger U is made by and upon the mechanism which operates the lever T; but when it is remembered that great accuracy is required in bringing the saw-tooth into position, as it is desired to remove but a very slight portion of the tooth in the grinding process, it will be seen that on account of the variance in the power required to move the saw the proper distance it will become necessary to have mechanism whereby the lost motion in the joints of the various parts may be taken up, and this I accomplish by means of the mechanism H J K. Thus, if the lever T is properly set and the saw is running smoothly, the stroke of the lever T and the finger U will be sufficient to bring each successive tooth into the proper position under the grinding-wheel B′. If now the saw begins to move with more difficulty, the result will be that when the point V has encountered the stop all the slack or lost motion in the joints of the lever T and the pivot of the finger U will be found to be expressed, as it were, in the slight retardation of the saw G, so that the next tooth will not move quite so far as would be desirable. Now, by moving the nuts J on the rod H the part X and stop Y may be moved a sufficient distance away from the lever T to take up this lost motion and bring the tooth to the desired position. When a band-saw, G, is being ground, the mechanism shown in Fig. 8 is employed. The saw is passed over and along guides V² V² V² of any suitable shape and number, and a feed-finger, similar to the feed-finger U, is used on the opposite end of the rock-shaft to feed the opposite side of the saw.

I claim—

1. In a saw-sharpening machine, a feed-finger provided with a point and a side projection elevated above the bottom of the point, so as to strike the tooth above the base.

2. In a saw-sharpening machine, the combination of a pivoted feed-finger having a side projection and a point with a stop against which the point strikes.

3. In a saw-sharpening machine, a saw-carriage provided with a stop against which the point of the feed-finger strikes at the end of its stroke, and a bolt and a nut at one end, whereby the position of the carriage can be delicately adjusted at will to take up the lost motion in the joints, with a feed-finger which is pivoted and has a point to engage the stop.

4. In a saw-sharpening machine, the combination of a saw-carriage, a pivoted feed-finger, a stop on the carriage, and an adjusting nut and bolt, whereby the position of the carriage may be changed at will.

5. In a saw-sharpening machine, the combination of a saw-carriage bearing a stop, a pivoted feed-finger whose point strikes the stop, and an adjusting device to adjust the position of the stop so as to take up the lost motion of the joints and spring of the parts and cause the finger to feed a uniform distance whether the saw pulls hard or easy.

ELISHA B. RICH.

Witnesses:
FRANCIS W. PARKER,
CORA L. CADWALLADER.